May 31, 1927.  S. SMITH  1,630,545
TOP CONSTRUCTION
Filed Jan. 15, 1925    2 Sheets-Sheet 1

INVENTOR
SYDNEY SMITH
BY
P. W. Pomeroy
ATTORNEY

May 31, 1927.                    S. SMITH                    1,630,545
                              TOP CONSTRUCTION
                            Filed Jan. 15, 1925            2 Sheets-Sheet 2
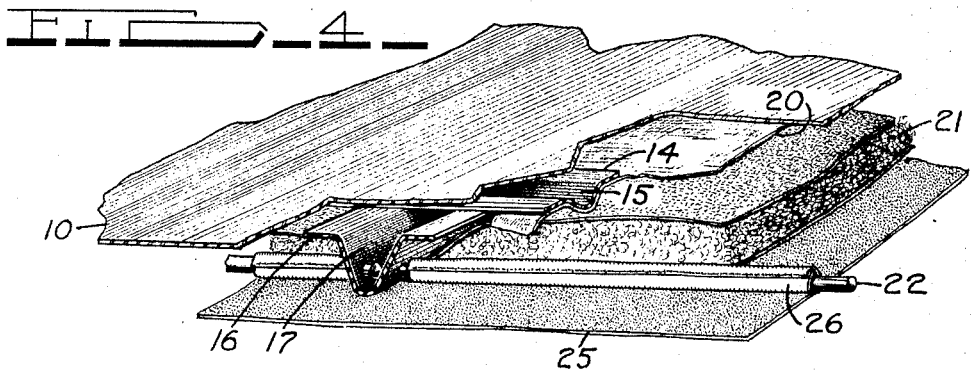
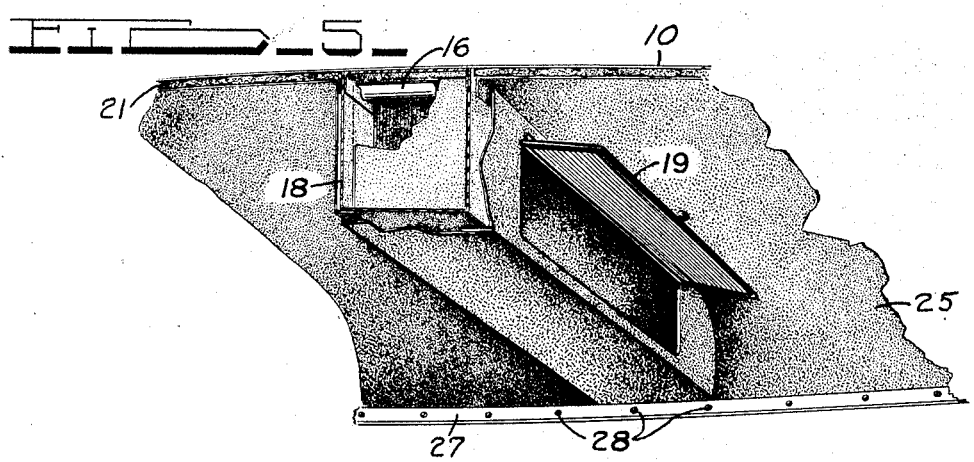
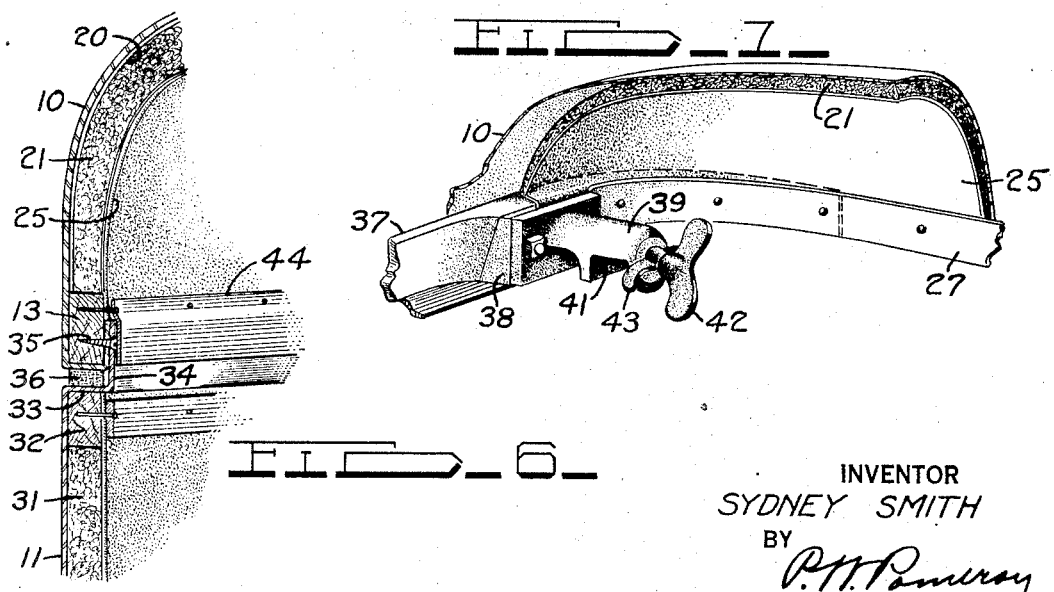
INVENTOR
SYDNEY SMITH
BY
P. H. Pomeroy
ATTORNEY Patented May 31, 1927.

1,630,545

UNITED STATES PATENT OFFICE.

SYDNEY SMITH, OF SOUTH BEND, INDIANA, ASSIGNOR TO THE STUDEBAKER CORPORATION, OF SOUTH BEND, INDIANA, A CORPORATION OF NEW JERSEY.

TOP CONSTRUCTION.

Application filed January 15, 1925. Serial No. 2,536.

This invention relates to tops for motor vehicles and the like and particularly to tops of the permanent type, and has for one of its objects to provide a novel and improved top, the main portion of which is composed of sheet metal to make it strong and durable and to which the various other top members and adjuncts may be applied to form a permanent unitary structure.

Another object is to provide a permanent vehicle top mainly constructed from a continuous sheet of metal of such a construction that it will not be subject to the "drumming" usually associated with tops of this type.

Another object is to provide a vehicle top mainly constructed from a continuous sheet of metal and provided on its under side with longitudinally and transversely extending reinforcing members.

Another object is to provide a vehicle top constructed mainly from a continuous sheet of metal and provided near its center on the under side with a transversely extending boxlike structure rigidly secured in place to act as a top reinforcing means and, if desired, also as a receptacle for storing or carrying articles.

Another object is to provide a vehicle top formed mainly from a continuous sheet of metal lined with a relatively thick sound-muffling or sound-absorbing substance.

A further object is to provide a vehicle top formed mainly from a continuous sheet of metal lined with a relatively thick sound-absorbing substance held in place against the sheet metal by a plurality of resilient members sprung into place.

The above being among the objects of the present invention the same consists of certain features of construction and combination of parts to be hereinafter described with reference to the accompanying drawings and then claimed, having the above and other objects in view.

In the accompanying drawings, which illustrate a suitable embodiment of the present invention, and in which like numerals refer to like parts throughout the several different views, Figure 1 is a perspective view of a finished automobile top constructed in accordance with the present invention shown mounted upon an automobile body.

Figure 4 is a fragmentary perspective view of a portion of the upper part of the top illustrated in Figure 2, showing the relation of the various parts thereto.

Figure 5 is a fragmentary perspective view of the under side of the center part of the top, showing the transverse box-like receptacle which forms a reinforcing member.

Figure 6 is a perspective sectional view taken vertically through the top and rear supporting panel showing the manner of uniting these two parts.

Figure 7 is a fragmentary perspective view of a portion of the right front corner of the top showing the means provided for connecting the same to the top front support.

Figure 1:
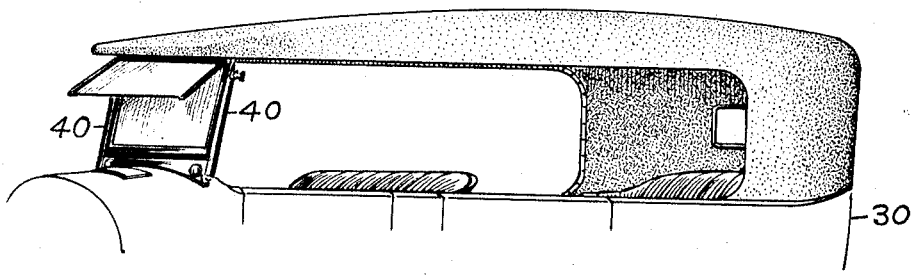
Figure 2:
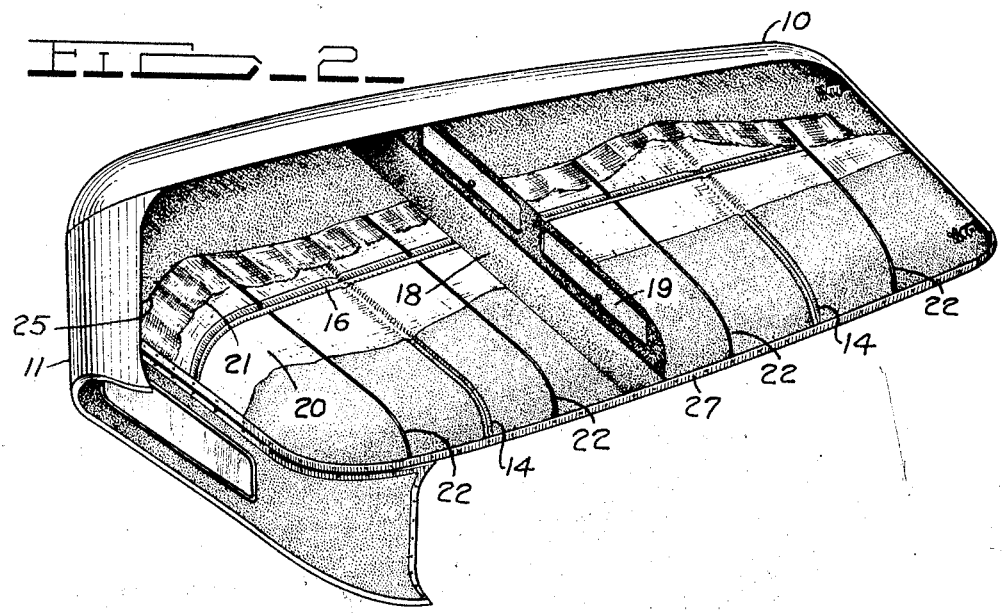
Figure 2 is a perspective view of the top shown in Figure 1 taken from below the same, the top covering not being shown and portions of the lining and sound-deadening material broken away to better illustrate the construction.

Although the construction shown in Figure 2, without the top covering would if properly finished constitute a finished top, it is preferable to provide the top covering to give a more pleasing appearance as shown in Figure 1. For this reason, and because it adds to the ease of description in the following specification and claims, the construction shown in Figure 2, that is, without the top covering, will hereinafter be referred to only as the top frame, although it is to be understood that the present invention is not limited to those constructions wherein the top covering is an essential element.

The top frame, as shown in Figure 2, is formed preferably from a single sheet of metal into the desired shape and contour, but in the following description and claims which will refer to the top frame as being constructed from a continuous sheet of metal, it will be kept in mind that the present invention is not limited to a metal top frame which is constructed from a single sheet of metal, as it is applicable to and includes those constructions where the same are made up of a plurality of units welded, riveted or otherwise suitably secured together to form a continuous sheet, and has the same practical results and effects as a frame constructed from a single sheet.

Top frames constructed from a continuous sheet of metal have had but a limited use in the past due to the fact that these early designs had a tendency to vibrate or hum in unison, to a highly objectionable degree, with other vibrations present in the vehicle of which they formed a part, or with the explosions of the engine, which objection has been eliminated in the present invention.

Figure 3:
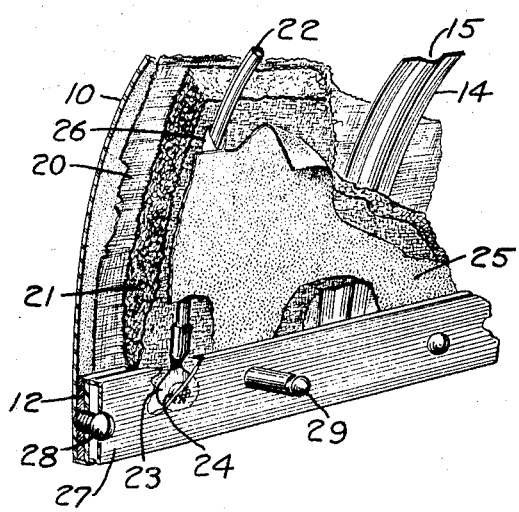
Figure 3 is a fragmentary perspective view of a portion of the side of the top illustrated in Figure 2, showing the relation of the various parts thereto.

The top frame 10 is formed from a continuous sheet of metal into the desired shape and contour, that is, to the shape of conventional tops as shown in Figures 1 and 2, or otherwise, but preferably such that no flat spots are present anywhere on its surface to better eliminate any drumming sound that may develop. The lower edge of the metal of the frame 10 forward of the rear supporting panel 11 is bent first inwardly and then back on itself and is provided with a metal strip 12 between the reversely bent portion and the side of the frame 10, as shown in Figure 3, for strengthening the same and for securing an anchoring means as will hereinafter be described, and that portion of the lower edge of the frame 10 immediately above the rear supporting panel 11 is likewise reversely bent but a wooden strip 13 is inserted between the reversely bent portion and the side of the frame, as shown in Figure 6, to better provide means for securing the rear supporting panel 11 thereto, although it is evident that the strip 12 may be continued to take its place if so desired. At spaced intervals transverse strengthening and stiffening members 14 are secured to the inner side of the frame 10 by welding, riveting or other suitable means and are extended down and are secured to the strip 12. The members 14 are preferably of strip metal having the center portion depressed to form a trough 15 to impart added strength thereto. A longitudinally extending centrally disposed strengthening and stiffening member 16 is also provided, formed and secured to the under side of the frame 10 in a like manner to the transverse members 14, it being provided with suitable depression at the points where it overlaps the transverse members 14, and having its depression or trough 17 deeper than the trough 15 of the members 14 for a purpose to be described later.

Extending transversely across the under side of the frame 10 approximately midway of its length is a box-like structure 18, formed from sheet metal, the upper surface of which is shaped to match the inner surface of the frame 10 at that point and is securely fastened in place by welding, riveting or the like directly to the under side of the frame 10. This box 18 materially strengthens the frame 10 and operates to counteract any stresses that may be set up within the same. To make the box 18 further useful doors such as 19 may be provided in its sides so that access may be had to its interior which may then be used as a means for storing side curtains or other objects.

The frame 10 may of itself be of sufficient rigidity and strength to resist any tendency towards drumming, but in order to further guard against these defects it may be preferable to provide means for deadening such sounds that may develop. The entire inner surface of the frame 10, including the members 14 and 16 is first covered by a fabric sheet 20 glued in place. This is followed by a relatively thick sheet of sound-deadening material 21 such as hair or felt which is preferably glued in place against the fabric sheet. The material 21 is ordinarily of such a nature as to require additional means for holding it in place against the inner surface of the frame 10 and the members 22 are provided for this purpose. These members 22 are formed from a spring-like material, such as spring wire, and as shown extend from the longitudinally stiffening member 16 down to the member 12. The member 16 is provided with openings in the side of the trough 17 which are adapted to receive the ends of the members 22 which project therethrough and abut against the opposite side of the trough 17, thus limiting their movement in that direction, as clearly shown in Figure 4, and the lower ends of the members 22 are provided with an eye member 23, as shown in Figure 3. The member 22 is sprung in place, forcing the material 21 against the inner face of the frame 10, and screws such as 24 are passed through the eye members 23 and threaded into the member 12, securely holding both the material 21 and members 23 in place. The top inner finishing lining 25 is held in place by looping the listings 26 and inserting the members 22 therein before springing them into place as previously described. The lower edge of the finishing lining 25 is brought down flush with the lower edge of the frame 10 and a channel sectional finishing strip 27 is drawn up against the same by means of screws such as 28 which thread into the strip 12, thereby clamping the lining 25 and material 21 between the strip 27 and the reversely bent lower edge of the frame 10 and concealing the eye 23 and screws 24. The strip 27 may be provided with means such as pins 29 for securing side enclosures thereto if such means are desired or are necessary.

The rear supporting panel 11, as shown in Figure 6, is also constructed of sheet metal shaped to match the lower rear portion of the frame 10 at its upper edge and the upper rear edge of the vehicle body at its lower edge. It is preferably lined with a material 31 similar to the material 21 in the frame 10, and is provided with a tacking strip 32 at its upper edge. The upper edge of the metal of the panel 11 as shown is bent over inwardly to form a seat 33, on which the lower edge of the frame 10 is adapted to rest and the metal is then bent upwardly to form an attaching flange 34 through which screws such as 35, or the like may be passed into the strip 13, thus securing the panel 11 to the frame 10. Means such as the strip 44 may then be provided to conceal the heads of the screws 35. A strip of anti-squeaking material such as 36 is preferably provided between the seat 33 and the lower edge of the frame 10.

An extra reinforcing member 37 is provided across the front end of the frame 10, as shown in Figure 7, to which a pair of blocks 38 and brackets 39 are secured for receiving and holding the upper ends of the top front supports 40. The brackets 39 may be of a conventional construction each of which is provided with a notch or socket 41 to receive the upper end of the corresponding support 40 which is held therein by means of a thumb-screw 42 locked in place by a thumb-nut 43.

Formal changes may be made in the specific embodiment of the invention described without departing from the spirit and substance of the broad invention the scope of which is commensurate with the appended claims.

What I claim is:—

1. A vehicle top frame comprising a continuous sheet of metal having a substantially flat deck portion and integral curved side members, the lower edge of said metal being reversely bent to form a channel, a reinforcing member within said channel, and transversely extending reinforcing members secured to the under side of said frame and to said first-named reinforcing member.

2. In a vehicle top, a frame therefor comprising a continuous sheet of metal formed to the shape of the finished top, a lining of sound-insulating material for said frame and concealed resilient members for holding said material in contact with the under surface of said frame.

3. In a vehicle top, a frame therefor formed from a continuous sheet of metal, having a substantially flat horizontal portion and integral curved side members, a longitudinally extending centrally disposed trough-shaped strengthening member permanently secured to the under side of said frame, a sound-insulating lining for said frame, and rib-like members extending from the lower edge of said frame to said member for holding said lining against said frame.

4. In a vehicle top, a frame therefor comprising a continuous sheet of metal formed to the shape of the finished top, a centrally disposed longitudinally extending trough-shaped strengthening member permanently secured to the under side of said frame, a reinforcing member at the lower edge of said frame, a sound-insulating lining for said frame, and resilient rib-like members for holding said lining against the under side of said frame, one end of said rib-like members passing through one side of said trough-shaped member and abutting against the other side thereof, and the lower end of said rib-like member being secured to said reinforcing member.

5. A top frame for vehicles comprising a continuous sheet of metal having a substantially flat horizontal portion and integral curved side members, transverse reinforcing members therefor secured to said curved side members, a longitudinal reinforcing member having a depressed central portion of greater depth than said transverse members and adapted to receive the same, sound-absorbing material secured to said sheet of metal, and a lining to conceal said sheet of metal, reinforcing members, and sound-absorbing material.

6. In a vehicle top, a frame therefor comprising a sheet metal cover, a longitudinally extending centrally disposed trough-shaped reinforcing member secured to said cover, a sound-insulating lining for said frame, and securing means for said lining secured at one end to said cover and at the other end to said reinforcing member.

7. In a vehicle top, a frame therefor comprising a sheet metal cover, a longitudinally extending trough-shaped reinforcing member secured to said cover, a lining for said frame, and securing means for said lining secured at one end to the lower edge of said cover and at the other end to said reinforcing member.

8. In a vehicle top, a frame therefor comprising a sheet metal cover, a longitudinally extending reinforcing member secured to said cover, a lining for said frame, and concealed securing means for said lining secured at one end to said cover and at the other end to said reinforcing member.

9. In a vehicle top, a frame therefor comprising a sheet metal cover, a longitudinally extending centrally disposed trough-shaped reinforcing member secured to said cover, a lining for said frame, and concealed securing means for said lining having one end inserted in said reinforcing member and the other end secured to said cover.

10. In a vehicle top, a frame therefor formed from a continuous sheet of metal having a substantially flat horizontal portion and integral curved side members, the lower edge of said metal being reversely bent to form a channel, a reinforcing member within said channel, a support for said frame comprising a sheet metal member bent inwardly and upwardly at its upper end to provide a flange adapted to abut against the reversely bent portion from said channel, and means to secure said flange to said reversely bent portion and said reinforcing member to thereby secure said frame to said support.

11. In a vehicle top, a sheet metal frame therefor having a substantially horizontal top portion and integral side members, the lower edge of said metal being reversely bent to form a channel, a reinforcing member within said channel, a support for said frame comprising a member bent inwardly and upwardly at its upper end into parallel relation to two sides of said reversely bent portion, and means to secure said member to said reversely bent portion to thereby secure said frame to said support.

Signed by me at South Bend, Indiana, U. S. A., this 9th day of January 1925.

SYDNEY SMITH.